(12) United States Patent
Dargy et al.

(10) Patent No.: US 11,333,641 B2
(45) Date of Patent: May 17, 2022

(54) LIQUID FRACTION COLLECTOR FOR LIQUID CHROMATOGRAPHY SYSTEM

(71) Applicant: Cytiva Sweden AB, Uppsala (SE)

(72) Inventors: Stefan Dargy, Uppsala (SE); Olle Bjernulf, Uppsala (SE); Mats Lundkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 248 days.

(21) Appl. No.: 16/070,846

(22) PCT Filed: Jan. 27, 2017

(86) PCT No.: PCT/EP2017/051867
§ 371 (c)(1),
(2) Date: Jul. 18, 2018

(87) PCT Pub. No.: WO2017/129802
PCT Pub. Date: Aug. 3, 2017

(65) Prior Publication Data
US 2019/0064128 A1 Feb. 28, 2019

(30) Foreign Application Priority Data

Jan. 29, 2016 (GB) ...................................... 1601667

(51) Int. Cl.
*G01N 30/80* (2006.01)
*G01N 35/10* (2006.01)
(Continued)

(52) U.S. Cl.
CPC ........... *G01N 30/80* (2013.01); *G01N 35/025* (2013.01); *G01N 35/1011* (2013.01); *G01N 2030/027* (2013.01); *G01N 2035/0439* (2013.01)

(58) Field of Classification Search
CPC .... G01N 30/80; G01N 30/82; G01N 35/1011; G01N 35/1081; G01N 35/109; G01N 35/1093
(Continued)

(56) References Cited

U.S. PATENT DOCUMENTS 3,909,203 A * 9/1975 Young .................. G01N 35/109
422/67
4,077,444 A 3/1978 Gilson et al.
(Continued)

FOREIGN PATENT DOCUMENTS

CN 204462165 U 7/2015
CN 1049897827 A 9/2015
(Continued)

OTHER PUBLICATIONS

Chinese Office Action for CN Application No. 201780008928.6 dated Feb. 22, 2020 (17 pages).
(Continued)

*Primary Examiner* — Nathaniel J Kolb
(74) *Attorney, Agent, or Firm* — Eversheds Sutherland (US) LLP (57) ABSTRACT

Disclosed is a fraction collector for dispensing liquids into plural receptacles (P1,P2) arranged in a two dimensional array. The fraction collector comprises a table (22) for supporting said receptacles, and an arm supported above the table, in turn supporting a liquid dispenser (35), the fraction collector arm is rotatable about an arm axis (C) and the liquid dispenser is movable along the arm on a carriage 34 (FIG. 2). Thereby, the dispenser is low cost and is repositionable simply above the receptacles as a result of said rotation and as a result of said movement along the arm, without occupying too much laboratory bench space.

13 Claims, 8 Drawing Sheets

(51) Int. Cl.
 G01N 35/02 (2006.01)
 *G01N 30/02* (2006.01)
 *G01N 35/04* (2006.01)

(58) Field of Classification Search
 USPC .................................................. 73/864.25
 See application file for complete search history.

(56) References Cited

U.S. PATENT DOCUMENTS

| | | | |
|---|---|---|---|
| 5,306,087 A * | 4/1994 | Nakamura | G01G 17/04 177/245 |
| 5,443,791 A * | 8/1995 | Cathcart | B01L 3/50825 422/561 |
| 5,488,874 A * | 2/1996 | Kawanabe | G01N 35/109 73/863.01 |
| 6,610,208 B1 * | 8/2003 | Andersson | G01N 30/82 210/198.2 |
| 7,361,269 B2 | 4/2008 | Roenneburg et al. | |
| 7,469,606 B1 * | 12/2008 | Wiederin | G01N 1/38 73/864.24 |
| 7,485,464 B2 * | 2/2009 | Platano | G01N 1/38 422/510 |
| 7,875,456 B2 * | 1/2011 | Platano | G01N 35/109 436/47 |
| 8,071,053 B2 * | 12/2011 | Matsuzaki | G01N 35/10 422/509 |
| 2002/0104583 A1 | 8/2002 | Andersson | |
| 2003/0152493 A1 * | 8/2003 | Lefebvre | G01N 30/24 422/509 |
| 2004/0219062 A1 * | 11/2004 | Platano | G01N 1/38 422/63 |
| 2006/0254509 A1 | 11/2006 | Morikawa | |
| 2009/0038415 A1 * | 2/2009 | Matsuzaki | G01N 35/10 73/864.21 |
| 2009/0162942 A1 * | 6/2009 | Platano | G01N 35/109 436/180 |
| 2011/0139303 A1 | 6/2011 | Agren et al. | |
| 2013/0174520 A1 | 7/2013 | Tessier et al. | |

FOREIGN PATENT DOCUMENTS

| | | |
|---|---|---|
| JP | 03-21800 U | 3/1991 |
| JP | H05-92717 U | 12/1993 |
| WO | 00/02038 A1 | 1/2000 |

OTHER PUBLICATIONS

PCT International Search Report and Written Opinion for PCT Application No. PCT/EP2017/015867 dated May 3, 2017 (10 pages).
GB Search Report for GB Application No. 1601667.7 dated Jul. 15, 2016 (4 pages).
Japanese Office Action for JP Application No. 2018-539405 dated Nov. 2, 2020 (9 pages with English translation).

* cited by examiner

LIQUID FRACTION COLLECTOR FOR LIQUID CHROMATOGRAPHY SYSTEM

CROSS REFERENCE TO RELATED APPLICATIONS

This application claims the priority benefit of PCT/EP2017/051867 filed on Jan. 27, 2017 which claims priority benefit of Great Britain Application No. 1601667.7 filed Jan. 29, 2016. The entire contents of which are hereby incorporated by reference herein.

FIELD OF THE INVENTION

The present invention relates to fraction collectors, for example fraction collectors used in the field of liquid chromatography for sequential dispensing of liquids from a source, typically collected fraction by fraction in a plurality of adjacent receptacles in a cassette or cassettes over a time period as the chromatography process progresses.

DESCRIPTION OF RELATED ART

A fraction collector is a device used for dispensing a liquid into a number of receptacles. Traditionally receptacles such as test tubes are fed towards a dispensing means one by one, for example on a conveyor or track.

More versatile fraction collectors have been disclosed. For example U.S. Pat. Nos. 8,858,899 and 4,422,151 show an X-Y table mechanism is used to supply multiple receptacles, wherein, collecting tubes are arranged in a rectangular grid pattern and an outlet conduit is positioned over each collecting tube by a rectilinear positioning movement. In such fraction collectors, herein referred to as "X-Y-collectors", it is usually the outlet conduit that is moved with respect to the collecting tubes. Another mechanism is described in U.S. Pat. No. 4,077,444 which shows an X-Y-collector wherein both a receptacle supporting table and a delivery head are moved linearly, in transverse directions with respect to each other.

Numerous other fraction collectors are known, including a rotatably mounted turntable for supporting a plurality of collection tubes, for example U.S. Pat. Nos. 4,862,932 and 6,450,218. In fraction collectors of the turntable type, a liquid is sequentially discharged into the collection tubes through an outlet conduit, such as a hollow needle. The outlet conduit is mounted on an arm reaching over the turntable. Typically, the arm can swing around a vertical post to be positioned over different radial rows of collecting tubes. These fraction collectors are described herein as turntable fraction collectors.

There is a general need to provide a fraction collector which is rugged and reliable for use in experimental chromatography, where multiple experiments take place usually on a laboratory bench and where space is often limited. So the space occupied by the collector is important.

There is also a drive to standardise laboratory receptacles and so standardised microplates, such as those sold under the trade name 'Microtiter' are popular for holding liquids. The inventors have recognised that dispensing fractions into such standardised microplates allows more convenient subsequent processing. One popular microplate has 96 receptacles known as wells in an eight by twelve, two dimensional orthogonal array. Such plates typically have dimensions of about 85 mm by 128 mm, thus, taking into account the thickness of the plastics moulded well walls, each well has an opening of about 8 mm across. The height of the wells can be about 45 mm. If the wells are deep enough, a millilitre or so (1 ml-1.5 ml), of fluid can be collected in each well.

A conventional X-Y-collector has a table for holding the receptacles, and is further equipped with means for moving a dispensing tube over and between the receptacles. Typically, the moving of the dispensing tube is achieved by the use of a set of stepping motors. However, these X-Y machines take up a relatively large area on the bench because, the linear drives needed for an X-Y collector occupy more volume than a rotary drive so tend to take up more space on the laboratory bench. Even when the receptacle table is moved in the X and Y directions, and the dispensing head is kept stationary, further valuable benchspace is lost.

The turntable fraction collector is useful in many applications and is generally more space efficient because the rotational drives take up less space than linear drives needed for X-Y collectors. However, X-Y-collectors are more suitable when handling a large number of receptacles formed in microplates, because they can operate in the same linear directions as the microplate array. Conventional turntable fraction collectors cannot handle such microplates.

Compared to the turntable collector, a X-Y-collector requires a longer attachment tubing, since the equipment providing the liquid is stationary with respect to the receptacles, and the tubing therefore has to follow the dispensing tube to any receptacle. Especially in high-resolution liquid chromatography, this long tubing is a disadvantage because the long travelling distance of the liquids in the tube gives the initially separated components in the liquid a longer time period to diffuse within the liquid flow, and consequently the precision of the separation is negatively affected.

SUMMARY OF THE INVENTION

Embodiments of the invention described herein address the need for a space saving fraction collector with the ability to dispense into a microplate formed as a two dimensional array of closely spaced wells.

Embodiments of the invention described herein address the need for a reliable and rugged, yet small fraction collector.

Embodiments of the invention described herein address the need for a low cost fraction collector.

The invention provides a fraction collector according to claims 1 and 10 having preferred features defined by claims dependent on claims 1 and 10 respectively.

An embodiment of the fraction collector according to the invention includes a table for supporting a liquid receiving plate including a two dimensional array of liquid receptacles, an arm rotatably mounted for movement above the table and a carriage supported on the arm for linear movement relative to the arm, said carriage supporting a liquid dispenser adapted for dispensing liquids movable in a two dimensional plane above the table for dispensing liquids into said receptacles.

The embodiment of the traction collector mentioned immediately above includes a first drive motor operative to rotate the arm, and a second drive motor operative to move the carriage, each drive motor being located under the table.

The invention extends to any combination of features disclosed herein, whether or not such a combination is mentioned explicitly herein. Further, where two or more features are mentioned in combination, it is intended that such features may be claimed separately without extending the scope of the invention.

Further scope and applicability of the present invention will become apparent from the detailed description. However, it should be understood that a detailed description and specific examples while indicating preferred embodiments of the invention are given by illustrations only. The invention, together with its objects and the advantages thereof, may be understood better by reference to the following description taken in conjunction with the accompanying drawings, in which like reference numerals identify like elements in the Figures.

BRIEF DESCRIPTION OF THE DRAWINGS

The invention can be put into effect in numerous ways, illustrative embodiments of which are described below with reference to the drawings, wherein.

DETAILED DESCRIPTION OF PREFERRED EMBODIMENTS

Figure 1:
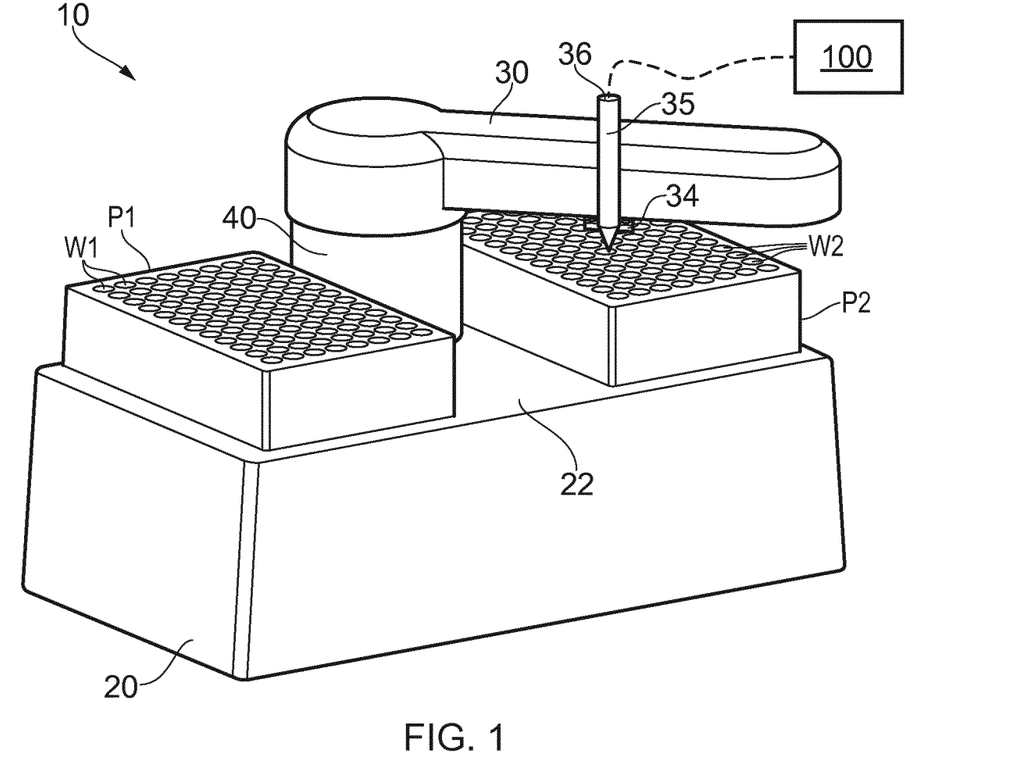
FIG. 1 shows a perspective view of an embodiment of a fraction collector according to the present invention.

An embodiment of a fraction collector 10 is shown in the figures. Referring to FIG. 1, the fraction collector 10 includes a hollow base 20 having a table top 22 for receiving two microplates P1 and P2 and a static pedestal 40 extending upwardly from the table so as to be between the two plates, which in turn supports an arm 30, rotatable on the pedestal 40 and above the microplates P1 and P2. The pedestal 40 thus sits mid-way along the width of the table and to one side of the table, allowing two microplates to sit on the table, one on each opposing side of the table/pedestal. The arm 30 supports a repositionable carriage 34 which in turn supports a liquid dispenser 35 above the microplates. The dispenser 35 is positionable above any one of a plurality of liquid receptacles, herein called wells, W1 and W2 of the microplates P1 and P2 for dispensing liquids into those wells. The dispenser 35 is fed by a flexible tube 36 shown only partially, supplied, in this embodiment, by chromatographic equipment 100.

Figure 2:
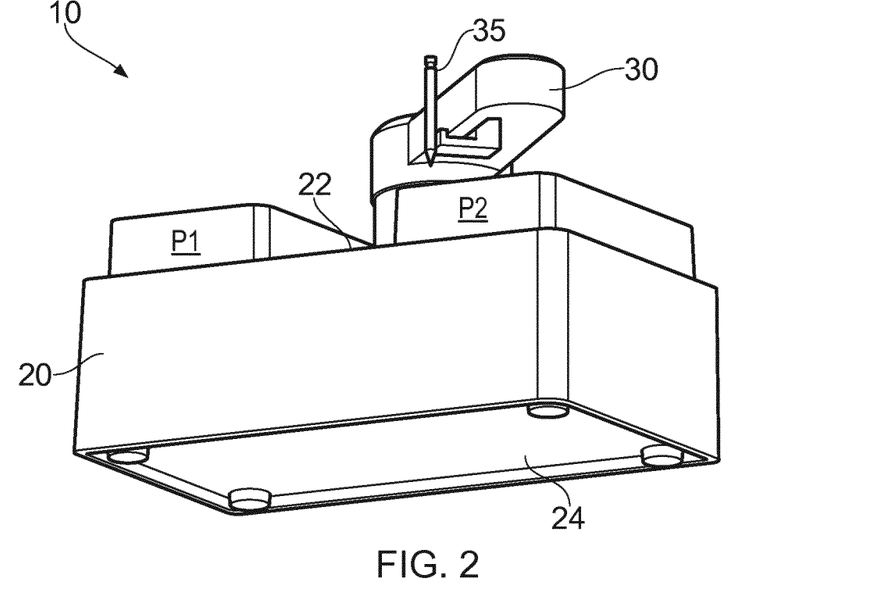
FIG. 2 shows a further perspective view of the fraction collector shown in FIG. 1.

FIG. 2 shows the same collector 10, and also shows a bottom plate 24 which, together with the unitarily moulded housing 20 and pedestal 40, provides protection against liquid ingress into the housing, particularly if liquid is spilled onto the table 22.

Figure 3:
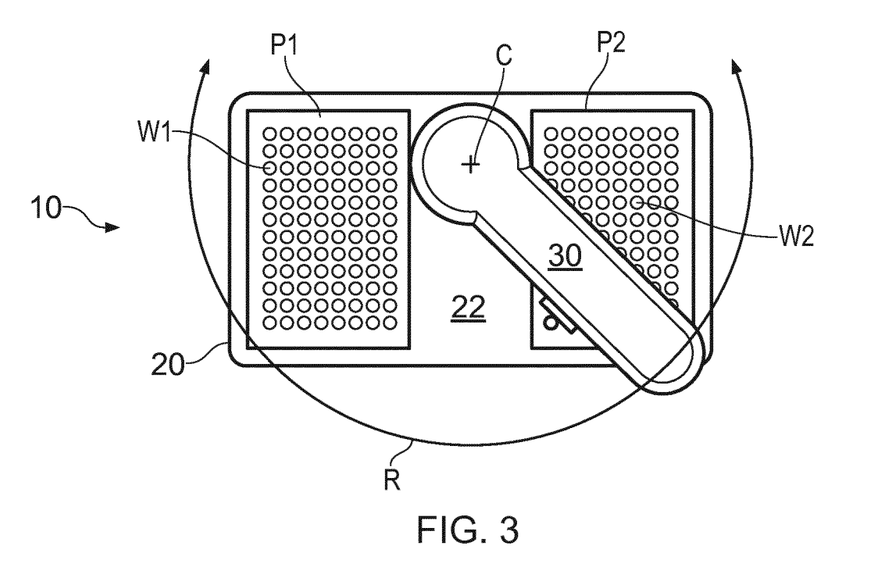
FIGS. 3, 4 &5 each show a plan view of the collector shown in FIG. 1, with the motions of the parts superimposed.
Figure 4:
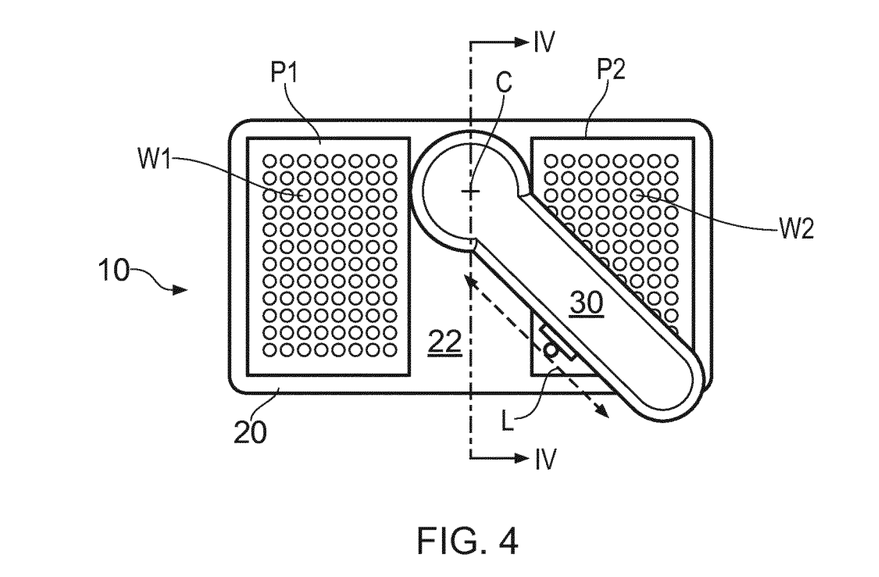

FIG. 3 shows the swinging motion attainable by the rotation of the arm 30. Arrow R represents the arcuate movement of the arm 30 about centre of rotation defined by axis C which is perpendicular to the table 22. Thus the dispenser 35 can be positioned in any position in the arc. FIG. 4 shows the further generally linear motion attainable by movement of the dispenser along the arm 30 in the direction of arrow L. The linear movement in the direction of arrow L occurs in use preferably concurrently with the arcuate moment described above, but sequential movement is possible also. Thereby, as a result of movements in the direction of arrow R and arrow L, the dispenser 35 is positionable and repositionable over any one of the wells W1 or W2, for dispensing liquid into those wells.

Figure 5:
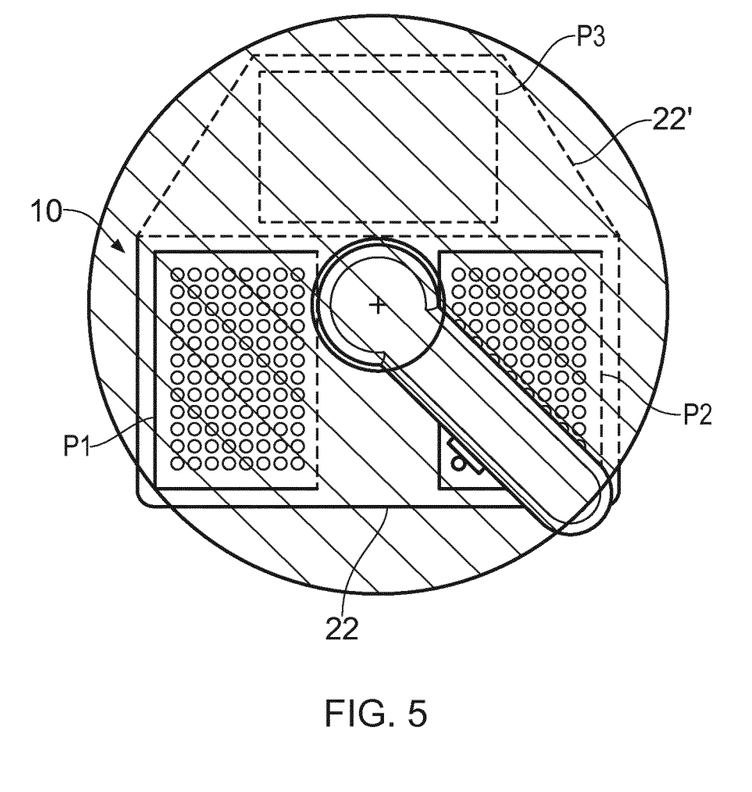

Taken further, it will be appreciated that the arm may swing through 360 degrees as shown in FIG. 5. This means that, if the table 22 is extended, using an extension 22', a further microplate P3 can be mounted to the extension 22' and can be used to collect further fractions of liquid if needed. The slight disadvantage of this embodiment is that further bench space would be needed.

Figure 6:
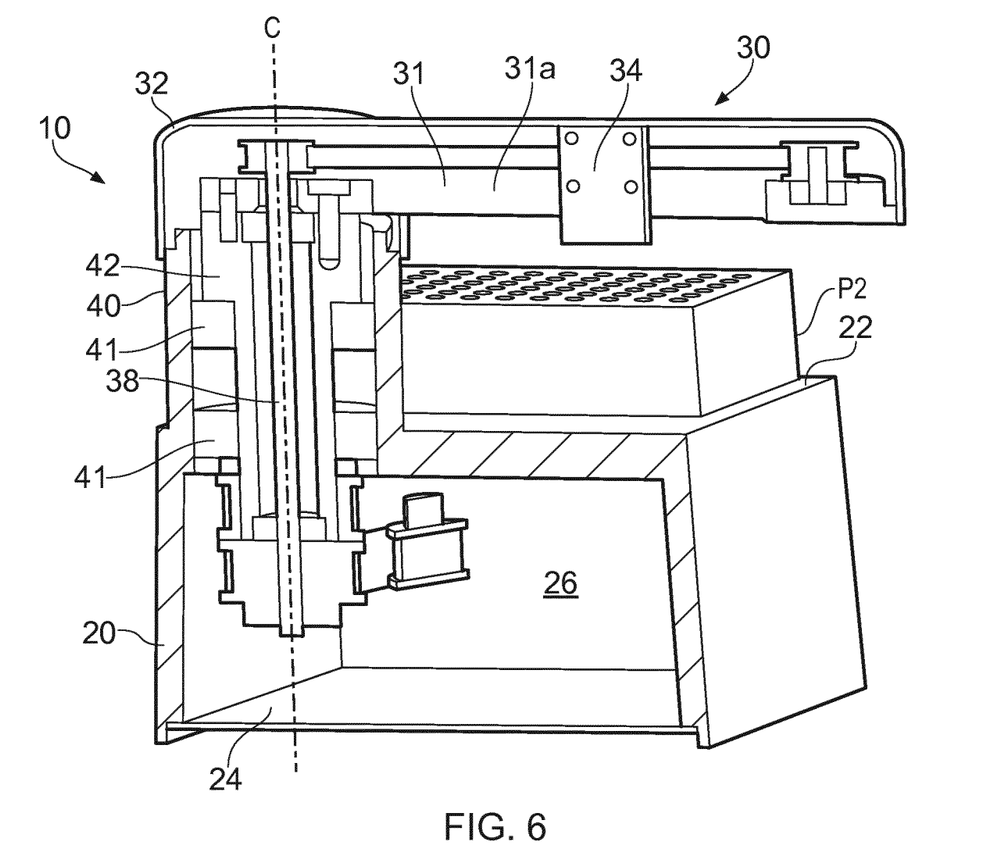
FIG. 6 shows a perspective sectional view of the fraction collector shown in FIG. 1.
Figure 7:
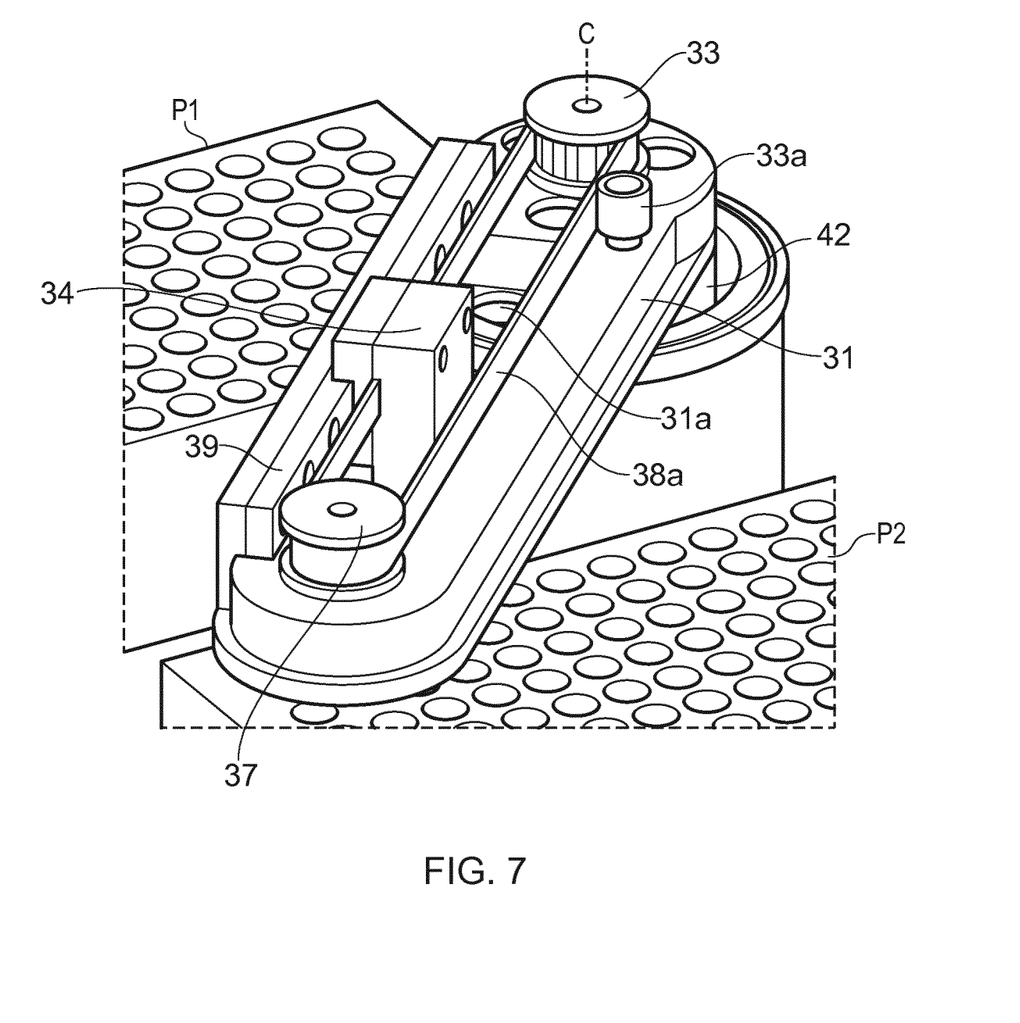
FIG. 7 shows details of an arm component of the fraction collector shown in FIG. 1.
Figure 8:
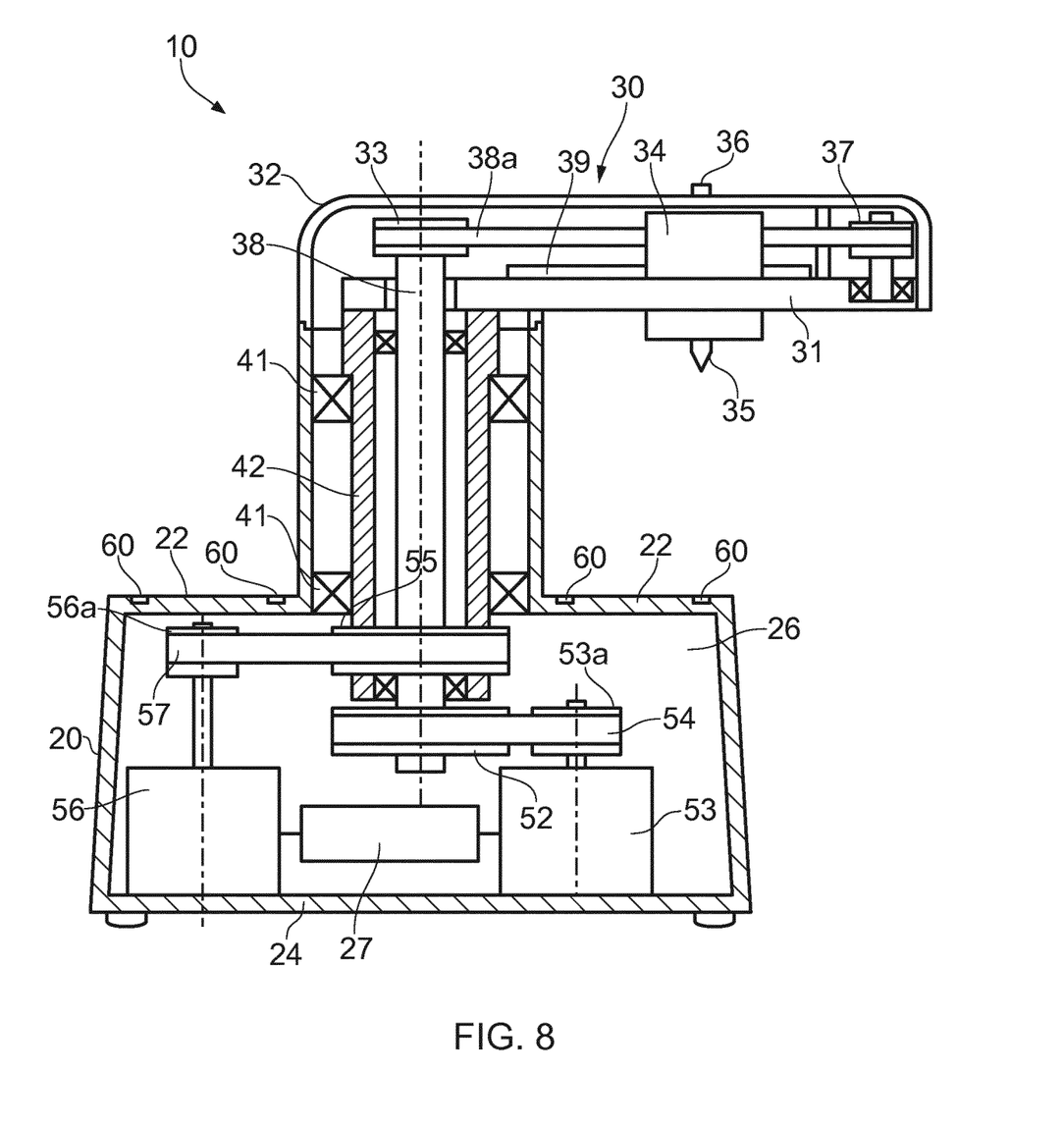
FIG. 8 shows a schematic representation of the sectional view shown in FIG. 6.

FIGS. 6, 7 and 8 illustrate the mechanisms used to obtain the desired dispenser movements. FIG. 6 is a section of the collector housing 20 taken along the plane IV-IV in FIG. 4, but with the arm 30 positioned over the sectional plane IV-IV so that its internal features can be better viewed in FIG. 6. The arm 30 includes a rigid arm member 31 supporting the carriage 34 which holds the dispenser 35 (FIG. 1). The carriage 34 extends into a slot 31a in the arm member 31, and the dispenser 35 will be attached to the lower end of the carriage protruding from the slot 31a. The arm member 31 is mounted on a support cylinder 42 which is driven to rotate by a predetermined angle about centre line C as described more fully below to cause arcuate movement of the arm 30 at least about arc R (FIG. 3). The cylinder 42 is supported on a pair of spaced bearings 41, which are in turn supported on the pedestal 40. Inside the cylinder 42 is a drive shaft 38 which is driven to rotate about centre line C coaxially with the cylinder 42. This motion moves the carriage 34 and dispenser 35 in a linear manner as described in more detail below.

More details of the mechanisms are shown in FIGS. 7 and 8. FIG. 7 shows the arm 30 with the cover 32 removed, revealing the arm member 31 mounted to the cylinder 42 for rotational movement about axis C. Fixed to the top of the drive shaft 38 is a toothed upper carriage drive pulley 33, which can rotate independently of the arm member 31. The carriage drive pulley 33 in use translates a toothed carriage drive belt 38a. The carriage belt 38a is held taught by an additional arm pulley 37 at the distal end of the arm member 31 and by a tensioner pulley 33a acting on the outside face of the belt 38b between the two pulleys 33 and 37. The carriage 34 is mounted on a linear bearing 39 mounted to the arm member 31, and is attached to the carriage belt 38a, such that movement of the carriage belt 38a via a drive pulley 33 and a drive shaft 38 causes linear movement of the carriage 34 along the bearing 39 in the direction of arrow L (FIG. 4), and so the position of the carriage 34 and the dispenser 35 can be changed.

FIG. 8 shows more details of the mechanisms, in schematic form. Drive shaft 38 can be rotated by means of a toothed lower carriage drive pulley 52 connected to a stepper motor 53 via a further carriage drive belt 54. The stepper motor 53 has an output pulley 53a which can be smaller than the drive pullet 52 to provide slower but more accurate carriage movements if needed, although other ratios, for example a 1:1 ratio as shown in FIG. 6, could be employed. Likewise the rotation of the whole arm 30 is brought about by rotation of an arm pulley 55, driven by a toothed belt 57 in turn driven by the output pulley 56a of an arm driving stepper motor 56. Again the output pulley 56a is smaller than the driven pulley 55 to reduce speed and increase accuracy, but other ratios could be used, for example a 1:1 ratio as shown in FIG. 6. Electrical parts including the drive stepper motors 53 and 54 together with known stepper motor control electronics 27, are enclosed within the housing 20 in the space 26 under the table 22, closed by the base plate 24. This not only provides a compact arrangement, but also inhibits liquid ingress into the electrical parts.

In operation microplates P1 and P2, for example, are mounted to the table 22 in complementary register slots, or channels 60 which match the features on the underside of the microplates P1 and P2. The control electronics is used to control the stepper motors such that the dispenser, translates signals supplied by the chromatographic equipment into the stepper motor signals needed to position the dispenser 35 sequentially above the known positions of the wells of a respective microplate by movement of the dispenser 35 in a two dimensional plane over the wells, the swept area of which is shown in FIG. 5. Although it is not essential, the control electronics 27 can include a microcontroller to compute simple stop-go type operational signals from the chromatographic equipment 100 into the instructions necessary for stepper motor movements to provide correct dispenser positioning, and can provide feedback of the resting position of the dispenser and or a confirmation signal to a pump or valve of the equipment 100, to allow filling of the well when the dispenser is correctly positioned.

Although the illustrated orthogonal two dimensional array of wells is preferred, it is possible that other well patterns could be employed, with suitable alterations to the running of the electronics 27. For example the wells could be arranged in staggered rows such that rounded wells can be closer together.

It should be noted that the illustration of FIG. 8, is schematic, in that no details of any connecting or attaching means are shown. It is of course obvious for anyone skilled in the art that the components shown could be formed and assembled in numerous ways, each one selected to suit the application at hand, a more detailed example of that assembly being shown in FIG. 6. Of course, the rotating movements shown could be transferred by any suitable means other than a belt transmission, such as a chain transmission, a gear transmission, a flexible drive shaft, or suitable four-bar linkages.

Figure 9:
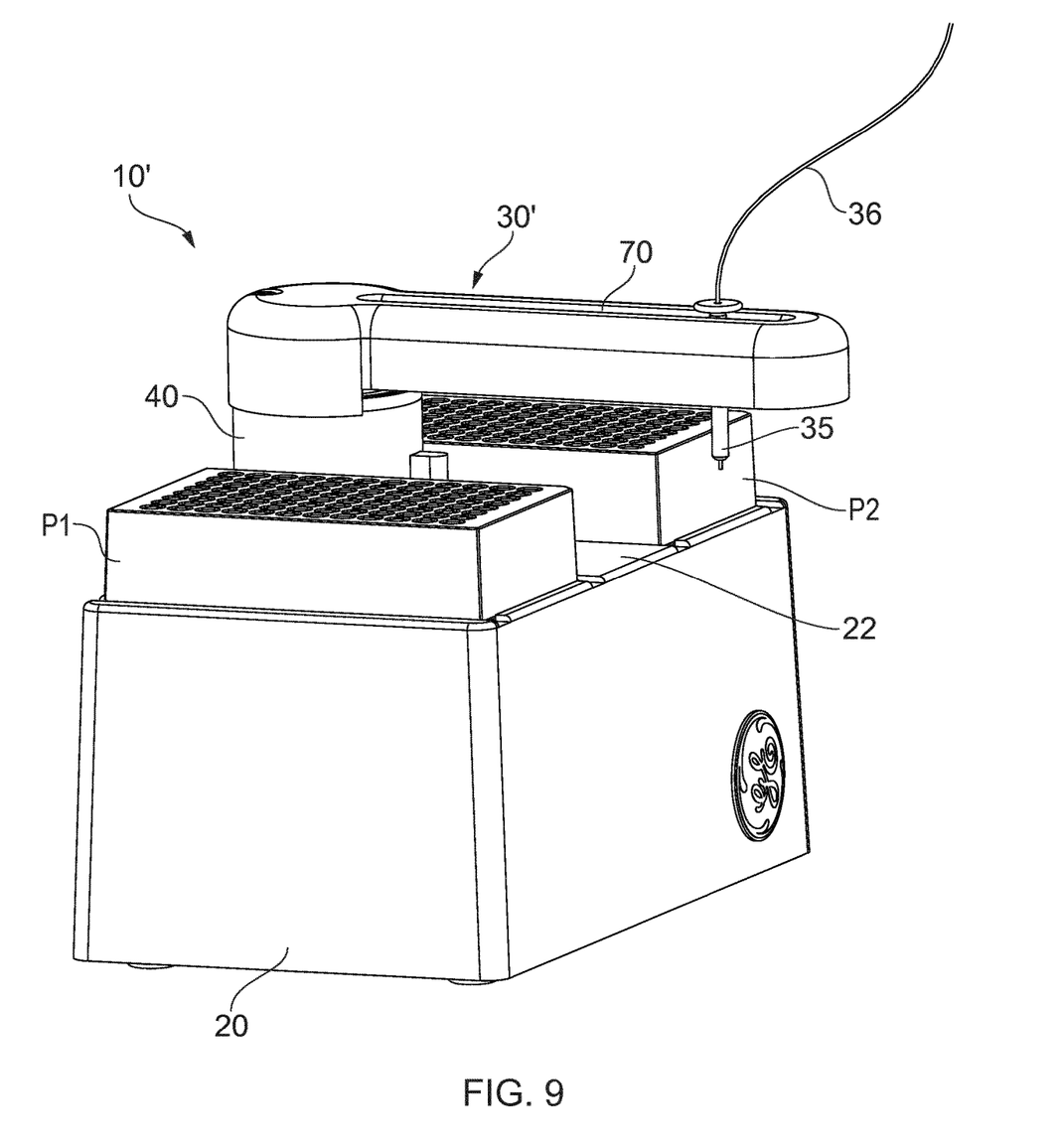
FIG. 9 shows a perspective view of another embodiment of the invention.
Figure 10:
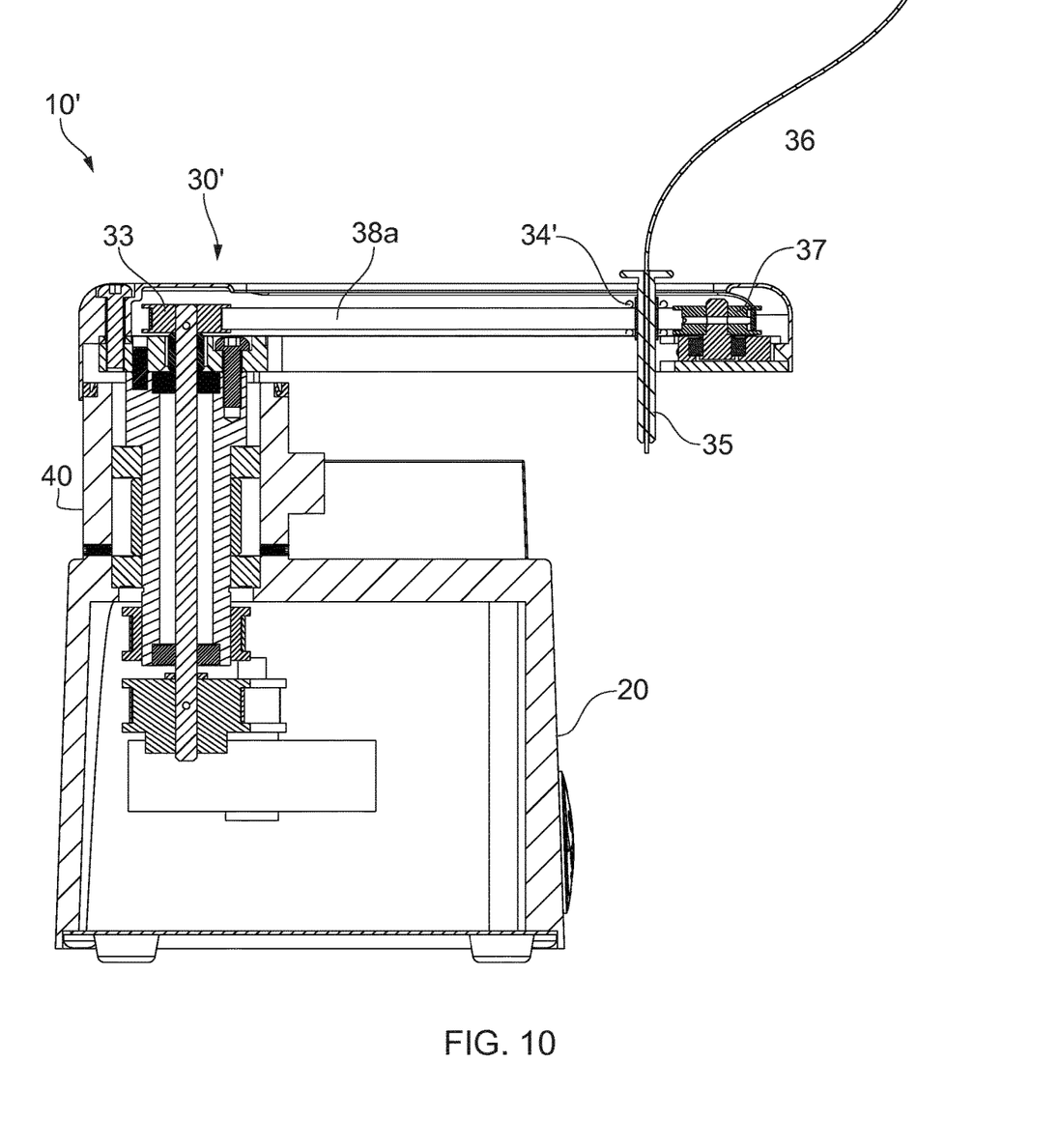
FIG. 10 shows a sectional view through the middle of the embodiment shown in FIG. 9.

One variant 10' of the fraction collector 10 is shown in FIGS. 9 and 10 where components having a function which is the same or similar to that of the fraction collector 10 described above have like reference numerals. FIG. 9 shows a base 20 having a central pedestal 40, privotably supporting an arm 30', along which can slide a liquid dispenser 35, fed by a capillary tube 36 for dispensing into collection microplates P1 and P2, all as described above with reference to FIGS. 1 to 8. However, this embodiment has a modified arm 30', including a central slot 70 in which the dispenser 35 travels in a driven linear manner in use.

FIG. 10 shows the slot 70 in more detail. The mechanism for moving the dispenser 35 along the arm 30 is similar to that described above, i.e. a toothed belt 33 held taut between two pulleys 33 and 37, one of which (33 in this case) is driven, except that the carriage 34' which is attached to the belt is made much smaller and so is less bulky than the carriage 34. In this variant the travel of the dispenser 35 can be increased if needed because the carriage is now smaller. In addition, the dispenser is less likely to be knocked or damaged because it is protected in part inside the arm 30'. In this variant, a linear bearing is used to keep the dispenser in the correct position as described above, although in a lower cost version (not shown) it is possible that the slot 70 supports the dispenser 35 and carriage 34' without such a bearing.

It is obvious for anyone skilled in the art that many variations of the invention are possible within the scope of the invention. Such variations include, but are not limited to, the type of driving means for the arm 30 and carriage 34, such as DC motors with gear boxes, lever arms driven by linear movements from, for example a hydraulic or pneumatic cylinder or linear drives.

Other omissions, additions or modifications are possible to the embodiments described without departing from the scope of the invention claimed.

The invention claimed is:

1. A fraction collector for dispensing liquids into plural receptacles arranged in a two dimensional array, the fraction collector comprising:
   a controller;
   a table for supporting said receptacles arranged in a two dimensional array;
   a liquid dispenser; and
   an arm supported above the table, in turn supporting the liquid dispenser,
   wherein the arm is rotatable about an arm axis allowing for arcuate movement of the arm and positioning of the liquid dispenser in any position in the arc,
   wherein the liquid dispenser is movable along the arm and the arm includes a carriage slideable on a linear bearing to provide said movement of the liquid dispenser along the arm, and
   wherein the controller is configured to control the arm to reposition the dispenser above the receptacles in the two dimensional array diagonally as a result of said arcuate movement and as a result of said movement along the arm concurrent with the arcuate movement.

2. The fraction collector as claimed in claim 1, wherein the movement of the carriage is caused by a belt connected to the carriage, in turn driven by a pulley, the pulley being driven by a carriage drive shaft coaxial with the arm axis controlled by the controller.

3. The fraction collector as claimed in claim 1, wherein the dispenser is disposed, at least partially within a slot in the arm and is slideable within the slot.

4. The fraction collector as claimed in claim 1, wherein the axis is perpendicular to the table.

5. The fraction collector as claimed in claim 1, wherein the table includes an upstanding pedestal, the axis runs through the pedestal and is rotatably supported on the pedestal.

6. The fraction collector as claimed in claim 5, wherein the arm is caused to rotate about the axis by a driven hollow cylinder mounted for rotation substantially within the pedestal and controlled by the controller.

7. The fraction collector as claimed in claim 5, wherein the pedestal is positioned on the table such that two arrays of receptacles can be accommodated on the table, one on each side of the pedestal.

8. The fraction collector as claimed in claim 1, further including a housing under the table, said housing including a carriage motor for driving said carriage drive shaft, and an arm rotation motor for driving the arcuate rotation of the arm via the hollow cylinder, wherein the carriage motor and arm rotation motor are controlled by the controller.

9. The fraction collector as claimed in claim 8 wherein the housing is formed to inhibit the ingress of liquids.

10. Chromatography equipment including the fraction collector of claim 1.

11. A fraction collector comprising: a controller; at least two microplates, each microplate including a plurality of liquid receptacles arranged in a two dimensional array; a housing protecting drive elements, the top of the housing being formed as a table, the table having at least two receiving positions each for receiving a microplate; and a rotatable arm supporting a liquid dispenser wherein the liquid dispenser is linearly movable along the arm, the fraction collector being characterised in that the arm is movable by means of the drive elements controlled by the controller, wherein the controller is configured to reposition the dispenser substantially above the receptacles, said arm having a rotational axis extending generally perpendicular to the table between the two microplate receiving positions thereby providing for concurrent linear and arcuate movement of the arm controlled by the controller allowing the liquid dispenser to be positioned in any position in the arc thereby dispensing liquids into the two dimensional array diagonally.

12. The fraction collector as claimed in claim 11, wherein the receiving positions include receiving features, which allow complementary relative positioning of the table and the microplates.

13. A method for dispensing liquids from a fraction collector into plural receptacles arranged in a two dimensional array, the method comprising:

positioning a liquid dispenser above a first receptacle of the plural receptacles;

dispensing liquid into said first receptacle;

repositioning the liquid dispenser above a second receptacle of the plural receptacles by a diagonal movement comprised of an arcuate movement of an arm supporting the liquid dispenser and a concurrent linear sliding movement of the liquid dispenser along the arm; and dispensing liquid into said second receptacle.

* * * * *